(12) United States Patent
Link et al.

(10) Patent No.: US 6,757,426 B2
(45) Date of Patent: Jun. 29, 2004

(54) SYSTEM AND METHOD FOR IMAGE PROCESSING BY AUTOMATIC COLOR DROPOUT

(75) Inventors: Bruce A. Link, Rochester, NY (US); Yongchun Lee, Rochester, NY (US); Wenjin Zhou, Rochester, NY (US); John J. Alescio, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 580 days.

(21) Appl. No.: 09/813,481

(22) Filed: Mar. 21, 2001

(65) Prior Publication Data

US 2002/0136447 A1 Sep. 26, 2002

(51) Int. Cl.[7] .............................. G06K 9/00; G03F 3/08
(52) U.S. Cl. ....................... 382/163; 382/172; 358/523
(58) Field of Search ................................. 382/162, 163, 382/165, 168, 169, 170, 172, 276; 358/449, 473, 488, 500, 501, 505, 522, 523, 530

(56) References Cited

U.S. PATENT DOCUMENTS

| | | | | |
|---|---|---|---|---|
| 4,707,747 A | * | 11/1987 | Rockwell, III | 358/473 |
| 4,727,425 A | | 2/1988 | Mayne et al. | 398/523 |
| 5,010,580 A | | 4/1991 | Vincent et al. | 382/163 |
| 5,014,328 A | | 5/1991 | Rudak | 382/163 |
| 5,014,329 A | | 5/1991 | Rudak | 382/163 |
| 5,119,184 A | * | 6/1992 | Hiratsuka et al. | 358/500 |
| 5,335,292 A | | 8/1994 | Lovelady et al. | 382/163 |
| 5,396,263 A | | 3/1995 | Seiler et al. | 345/115 |
| 5,461,493 A | | 10/1995 | Venable | 358/520 |
| 5,488,491 A | * | 1/1996 | Steinkirchner | 358/501 |
| 5,621,816 A | | 4/1997 | Ruppert | 382/163 |
| 5,664,031 A | | 9/1997 | Murai et al. | 382/317 |
| 5,841,897 A | * | 11/1998 | Numakura et al. | 382/163 |
| 5,841,899 A | * | 11/1998 | Ide et al. | 382/168 |
| 5,850,471 A | | 12/1998 | Brett | 382/162 |
| 5,966,461 A | | 10/1999 | Harrington | 382/167 |
| 6,035,058 A | * | 3/2000 | Savakis et al. | 382/163 |
| 6,064,761 A | * | 5/2000 | Metcalfe | 382/163 |
| 6,404,914 B1 | * | 6/2002 | Tanioka et al. | 382/162 |

* cited by examiner

Primary Examiner—Andrew W. Johns
Assistant Examiner—Amir Alavi
(74) Attorney, Agent, or Firm—The Harleston Law Firm

(57) ABSTRACT

An automatic method for processing a color form includes: a) scanning the color form in color space, forming a digital color image, and converting the digital color image into a two-dimensional binary image in chrominance space; and b) conducting a color form dropout process. Also, an automatic color dropout system includes: 1) a color detection system, including means for: (1a) scanning a color document and providing a digital image; (1b) converting the color digital image into luminance-chrominance space; (1c) detecting a background gray level, and assigning it to a Background Value; (1d) measuring color distribution; (1e) detecting the colors present; (1f) generating a color dropout table for each color; and 2) a color dropout system, including means for: (2a) scanning a color form document and providing a digital image; (2b) converting the digital image into luminance-chrominance space; (2c/d) storing and accessing the color dropout table; (2e) applying a color dropout map to the digital image; and (2f) replacing a pixel value with the Background Value.

20 Claims, 8 Drawing Sheets

```
                                                                336-60-54425
BOATNER          DARRYL      J   11 26 68    X       BOATNER          DARRYL      J

P.O. BOX 12552                       X               P.O. BOX 12552

JACKSONVILLE              FL                         JACKSONVILLE              FL 32209          (904) 355-5226                        32209

11 26 68      X

MEDICAID ADMIN
                                                             X

Signature on File                                    Signature on File
   Darryl Boatner              02/22/93                 Darryl Boatner no purchased services
                                                      X      on this claim

29592    SCHIZOPHRENIA 02 22 93          11 1   90844          295.92     130.00  1.0       038367889

59-3054030          102-93020092    X            130.00       .00      130.00
                                                      (904) 281-0013
   DAVID A.   OREA, M.D.                            PSYCHIATRIC CONSULTANTS, P.A.
   David A. Orea, m.b.                              4130 SALISBURY RD #1200
   052553          02/22/93                         JACKSONVILLE FL 32216
   MEDICAID ADMIN              (800) 289-7799                    05346760
   PO BOX 7072              TALLAHASSEE FL 32314
```

Fig. 10

SYSTEM AND METHOD FOR IMAGE PROCESSING BY AUTOMATIC COLOR DROPOUT

FIELD OF THE INVENTION

The invention relates to a system and method of digital image processing; more particularly, to automatic color dropout using luminance-chrominance space for high speed document scanning.

BACKGROUND OF THE INVENTION

In document image processing there is a need to extract textual information from an image that has color content in the background. Removal of certain color content is useful in specific applications, such as forms processing, where the color content on the form, which is used to facilitate data entry, adds no value to subsequent data processing. Color dropout reduces the image file size, eliminates extraneous information, and simplifies the task of extracting textual information from the image for the reader or processing system.

One application where color dropout is important is in the field of optical character recognition (OCR). The electronic color form dropout is a desired feature in form processing because it eliminates the interference of form structure from the text of interest, which reduces the complication of optical character recognition (OCR) application. In the OCR process, a document is scanned electronically, which converts the data on the form to a digital image. Once the data is captured in electronic form, the information to be read is separated from the background information, such as boxes and text with instructions on how to complete the form. This process results in the elimination of all but the desired information. Once this separation is accomplished, the text fields of the image are extracted and processed by an OCR algorithm.

A scanning system capable of capturing an image in color produces a digital image file with three color components, such as red, green and blue ("RGB"). The number of pixels in the color image depends on the resolution of dots per inch resolved by the camera optics and detector. The numerical value at each pixel of a color component represents the amount of the particular primary color detected at that pixel. In cases where all three color components have the same value, the resultant image is said to be a shade of gray. As the intensity of each color component is reduced, the gray appearance turns black.

Business forms are often printed with some background color, for example, a pastel color. One way of eliminating this background color is to use an optical filter in the electronic scanner, matched to the background color to be eliminated. The color filter prevents the scanner detector from discerning information printed in that particular color, therefore, the pastel background appears white to the scanner. The text printed in black or any color other than the filter color is captured by the scanner. This system limits the dropout colors to the particular filter installed on the scanner, which must match the background color on the forms. In other words, this system requires different filters for different color forms and is limited to dropping a single color.

Other available systems and methods that automatically identify the color of the desired data and eliminate background colors do not address certain needs. One such system/method for extracting data from business forms is automatic color dropout using luminance-chrominance space. Typically, the digital image generated is bi-tonal, such as black and white, or two different grayscale values. However, special problems are created by business forms that have been typed on various brands and styles of typewriters. Also, people use different types of pens and inks, such as dark blue ink, to fill in and sign business forms. This can also create problems in character and color recognition. Colors may vary from form to form. Also, achieving high resolution occurs at the expense of document scanning throughput.

Another problem with conventional systems and methods is that they do not address the adverse effects of inherent color noises on the precision and reliability of electronic color dropout. Inherent color noises are frequently induced in a scanning process by chromatic aberration and mis-registration of red, green, and blue (RGB) signals. A business form normally contains a finite number of uniform colors. Analysis of an electronic version of a business form that has been captured by flatbed scanners or rotary-type scanners reveals thousands of extra colors on the edges of image objects, such as lines and characters. These extra colors are called color fringes. Color fringes do not exist in the original business form documents. The occurrence of these false colors results in confusion of color dropout algorithms based on the minimum distance measures adopted in certain conventional methods, as described in commonly owned U.S. Pat. No. 6,035,058, Savakis et al, issued Mar. 7, 2000. For example, the color of an image pixel near an edge to be retained may be identical to the color of interest to be dropped out. These extra colors generated in a scanning process illustrate the difficulty in attempting to achieve perfect color dropout without losing some edge pixels of image objects. The color dropout technique of the present invention minimizes image information loss while eliminating the color of interest. In addition, the present invention supports dropping multiple colors and is even capable of determining the colors to be dropped.

The method of the present invention includes a color dropout technique suitable for high speed document scanning, which minimizes image information loss while completely eliminating the color of interest, even given a wide variety of color business forms. The present invention allows color dropout in two or, if desired, three dimensions. The two dimensional system allows simplification of the hardware required to achieve consistently clear images of data on a variety of business forms. With the present invention, hardware and look-up tables are smaller when compared to other available systems, and system implementation is simpler. In the method of the present invention, a stack of documents is distinguished, colors are selected based on the particular form, colors are detected by original scanning of the form in a color space, and then the image is processed to obtain two-dimensional color maps.

SUMMARY OF THE INVENTION

The present invention is an automatic method for processing a color image, comprising the steps of:

a) detecting color in a color form by scanning the color form in color space, preferably in red, green, and blue (RGB) color space, forming a digital color image, and converting the digital color image to a two-dimensional binary image in chrominance space, and, optionally, a three-dimensional binary image in luminance-chrominance space to determine the color or colors to be dropped; and b) conducting a color form dropout process.

An image processing system for automatic color dropout is also included herein. It includes:

1) a color detection system, comprising:
   - (1a) a color scanner for scanning a color document and providing a digital image;
   - (1b) a means for converting the color digital image into luminance-chrominance space;
   - (1c) a means for detecting a background gray level, and assigning it to a Background Value;
   - (1d) a means for measuring color distribution;
   - (1e) a means for detecting the number of colors and their distributions;
   - (1f) a means for generating a color drop table for each color present; and 2) a color dropout system, comprising:
   - (2a) a color scanner for scanning a color form document and providing a digital image;
   - (2b) a means for converting the color digital image into luminance-chrominance space;
   - (2c) a means for storing the color drop table;
   - (2d) a means for accessing the color drop table;
   - (2e) a means for applying a color dropout map to the digital image; and
   - (2f) a means for replacing a pixel value with the Background Value based on the color drop table.

BRIEF DESCRIPTION OF THE DRAWINGS

A more complete understanding of the invention and its advantages will be apparent from the detailed description taken in conjunction with the accompanying drawings, wherein examples of the invention are shown, and wherein:

FIG. 10 is the business form shown in FIG. 9 after color dropout according to the present invention.

DETAILED DESCRIPTION OF THE INVENTION

Figure 1:
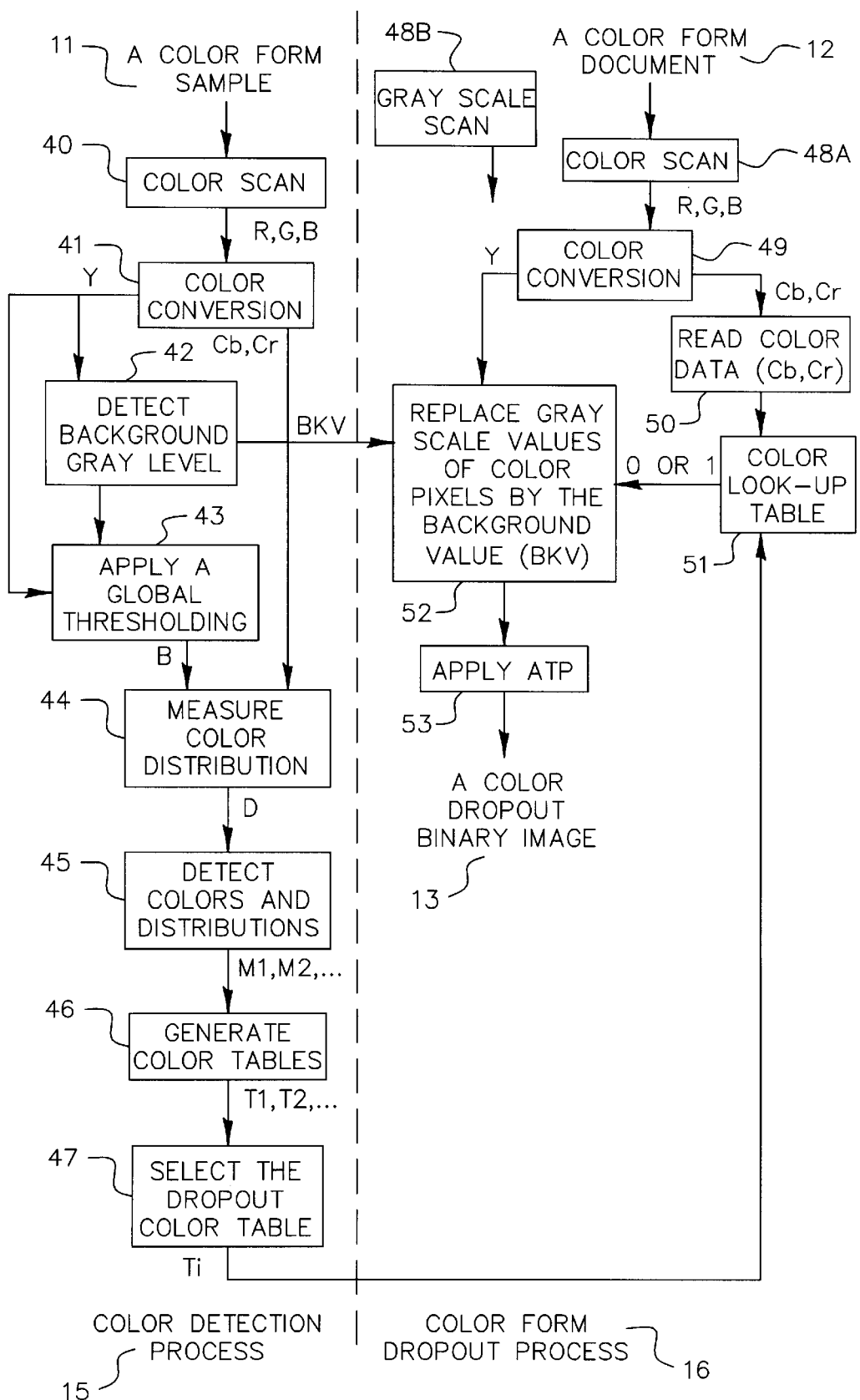
FIG. 1 is a flowchart according to one aspect of the present invention.

In the following description, like reference characters designate like or corresponding parts throughout the several views. Also, in the following description, it is to be understood that such terms as "above," "below," and the like are words of convenience and are not to be construed as limiting terms. Referring in more detail to the drawings, the invention will now be described.

Turning first to FIG. 1, a flowchart illustrates a preferred system, generally referred to herein as 10, and method, generally referred to as 14, both according to the present invention, for processing color images using color dropout technique. The preferred method 14 herein is comprised of two processes: a color detection process 15, and a color dropout process 16. The flowchart shown in FIG. 1 is divided by a dashed center line into a left side of the flowchart, which illustrates major steps of the color detection process 15, and a right side, which illustrates major steps of the color form dropout process 16. In general, the color detection process 15 extracts image background level and color information for use in the color dropout process 16. Therefore, the color detection process is conducted before the color dropout process. The color detection process 15 is operated off-line, so that real time image processing is not required to determine the color look-up tables. The color dropout process 16, though, is designed to dropout colors in real time high speed.

In general, it has been found that color is perceived in three basic color components: red, green and blue. Typically, the color output of a scanner is in red, green, blue ("RGB") color space. The three RGB channels are collected from a scan and converted into two chrominance channels and one luminance channel, such as in a YCbCr color space. In a preferred embodiment herein, YCbCr color space is used, where luminance is Y, blue chrominance is Cb, and red chrominance is Cr. Generally, the naked human eye is not sensitive to all color content, and does not read small changes in a color, although it does pick up relatively small variations in Y intensity.

As illustrated in FIG. 1, a first step in a color detection process 15 according to the present invention is step a) detecting color in a color form sample or samples 11. The color form sample(s) 11 contains the colors of interest to be eliminated in the color form dropout process. Step a) comprises the (sub)steps of:

- (a1) scanning the color form sample 11, preferably in red, green, and blue (RGB) color space, and producing digital image records, as shown in Block 40 of FIG. 1;
- (a2) converting the digital image records from step (a1) into two chrominance channels, Cb for blue chrominance, and Cr for red chrominance, and one luminance channel, Y, as shown in Block 41;
- (a3) detecting background gray levels, as shown in Block 42, for the luminance channel, Y, from step (a2), and assigning it to a Background Value (BKV);
- (a4) applying a global threshold level input (step a3), as shown in Block 43, to input from step (a2) to obtain a binary image;
- (a5) measuring color distribution, as shown in Block 44 (where "B" stands for "binary"), with input from steps (a4) and (a2);
- (a6) detecting colors and their distributions in the color form, as shown in Block 45 (where "D" stands for "distribution"), with input from step (a5), where M1, M2 . . . in the flowchart refers to multiple colors;
- (a7) generating color tables, as shown in Block 46, with the input from step (a6), where T1, T2 . . . refers to different color tables; and (a8) merging a dropout color table, as shown in Block 47, with the input from step (a7), where Ti is a look-up table (LUT). From Block 47, the method 14 extends over to the right side of the flowchart, to the color form dropout process 16.

The right side of the flowchart of FIG. 1 begins with a color form document 12, which is ordinarily fed into the scanner. The second step of the present invention is step b) conducting a color form dropout process, which comprises the (sub)steps of:

(b1) scanning the color form document 12, as shown in Block 48A, and producing a red, green, and blue (RGB) digital image;

(b2) converting the digital image from step (b1), as shown in Block 49, into two chrominance channels, Cb for blue chrominance, and Cr for red chrominance, and one luminance channel, Y;

(b3) reading color data, as shown in Block 50, from the two chrominance channels, Cb and Cr, from step (b2);

(b4) loading to a color look-up table, as shown in Block 51; and (b5) as shown in Block 52, replacing Y value in the digital image by a Background Value (BKV). Y (luminance) is from step (b2), Block 49, and BKV is derived from step (a3), shown in Block 42.

Continuing to refer to FIG. 1, there are importantly two alternate substeps for steps (b1) and (b5). At the same time that the color form document (RGB image) is being scanned, the color form can be scanned and a grayscale image produced [in step (b1i), see Block 48B]. Step (b5ii) then involves replacing the grayscale value from the grayscale scan. The grayscale value from step (b1i) is replaced with a Background Value (BKV), as shown in FIG. 1, Block 52. Here, the background gray level from step (a3), Block 42, of the color detection process 15 illustrated on the left side of the flowchart is used as the replacement grayscale value in step (b5), Block 52 on the right side, which represents the color pixel to be removed. In this manner, the grayscale pixels that represent the color pixels are replaced by the Background Value. Significantly, this achieves a higher image resolution than could be reached otherwise, if the resolution of the grayscale channel is higher than color channels.

Information from the color dropout table of step (a8), Block 47, is loaded to the color look-up table of step (b4), as shown in Block 51 of FIG. 1. A value of 0 or 1 is inputted from the color look-up table of Block 51 to step (b5), Block 52. The "1" indicates that the input pixel represents the color of interest to be eliminated, and the "0" indicates that the pixel represents the color to be retained.

Continuing with FIG. 1, steps (b2) through (b5) are repeated for each pixel within the scanned image. A preferred final substep in the color form dropout process 16 is (b6) applying an adaptive image thresholding process (ATP), as shown in Block 53, to produce a binary image, preferably a color dropout binary image 13, that is ready for use.

Once the color detection process is complete, the entire color form dropout process is automatic, which minimizes or eliminates the need for human operators, and proceeds at high speed, which minimizes waiting for results. This process accommodates variations between documents in the stack being scanned. By resetting threshold parameters within the color map detection process, a user can control, if desired, how much (aggressive) or how little is removed from the color documents.

The background intensity value of the image, then, is detected from the luminance (Y) channel, and the number of colors are determined from the two chrominance (CbCr) channels. Each individual detected color is represented in the form of a two dimensional bitmap in the chrominance (CbCr) space. Two or three dimensional maps can be generated herein.

Figure 2:
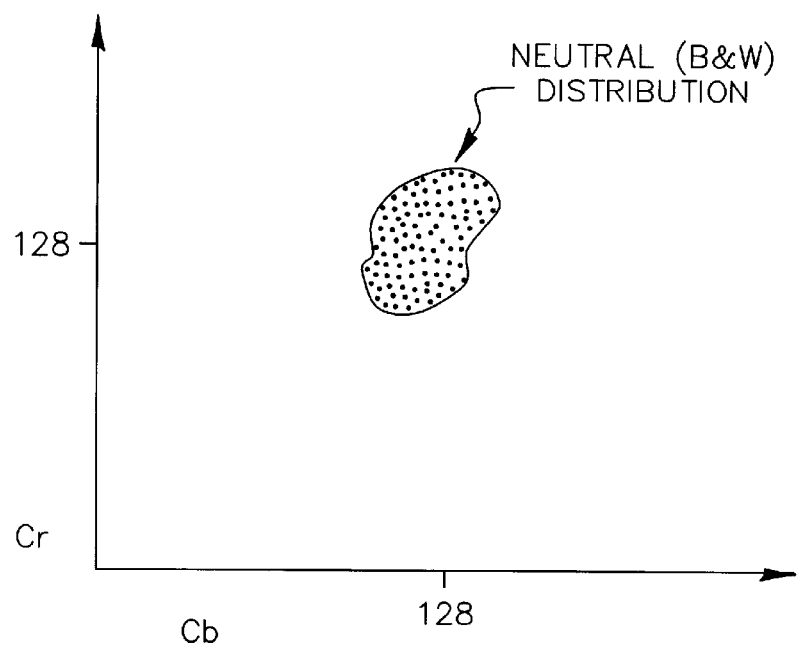
FIG. 2 is a graph of (Cr, Cb) showing a neutral/black and white distribution in an image processing system according to the present invention.
Figure 3:
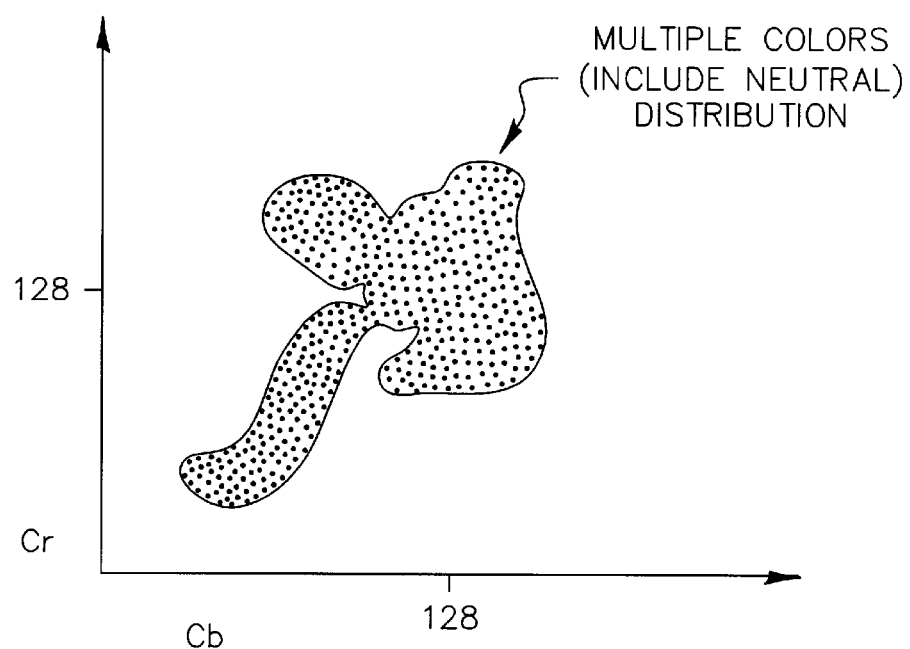
FIG. 3 is a graph of (Cr, Cb) showing multiple color distribution in an image processing system according to the present invention.
Figure 4:
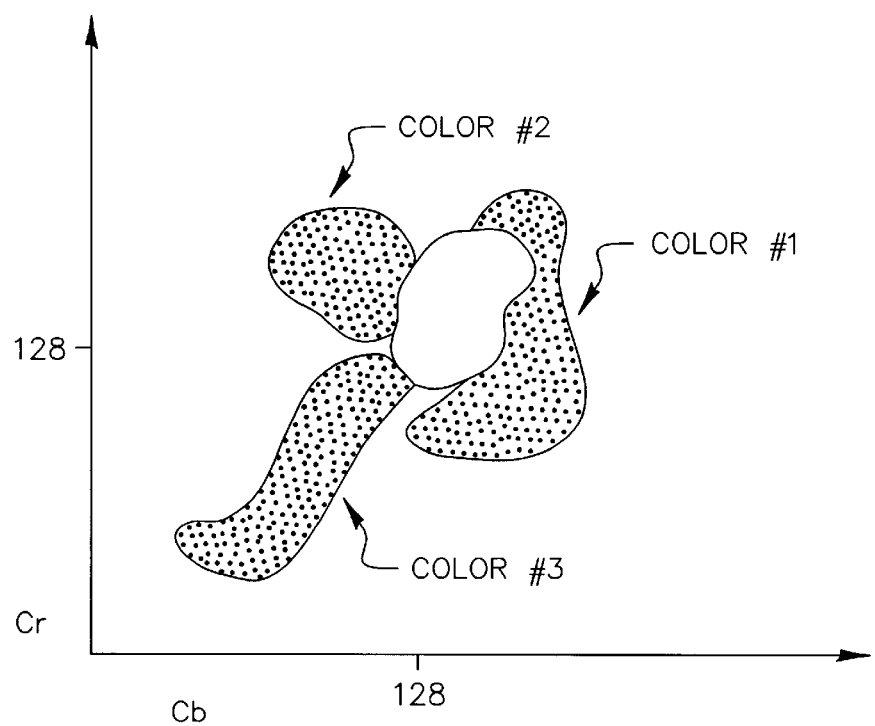
FIG. 4 is a graph of an image processing system according to the present invention, showing the (Cb, Cr) distribution of colors after removing the neutral distribution of FIG. 2 from FIG. 3.

Referring to the graphs in FIGS. 2 through 5, red chromicity is shown on the Y axis, versus blue chromicity on the X axis. Two dimensions are illustrated, then, in FIGS. 2–5. An example of measured (Cb, Cr) distribution for a neutral (Black & White) document image is presented in FIG. 2. The splotch in FIG. 2 shows the distribution of the neutral color. If desired, a user could add a third dimension by graphing red and blue chromicity as the first two dimensions, and intensity Y as the third dimension. In FIG. 3, an example of measured (Cb, Cr) distribution is shown for multiple colors, including neutral text for the color form. FIG. 4 shows the (Cb, Cr) distribution of colors after removing the neutral distribution of FIG. 2 from FIG. 3.

Figure 5:
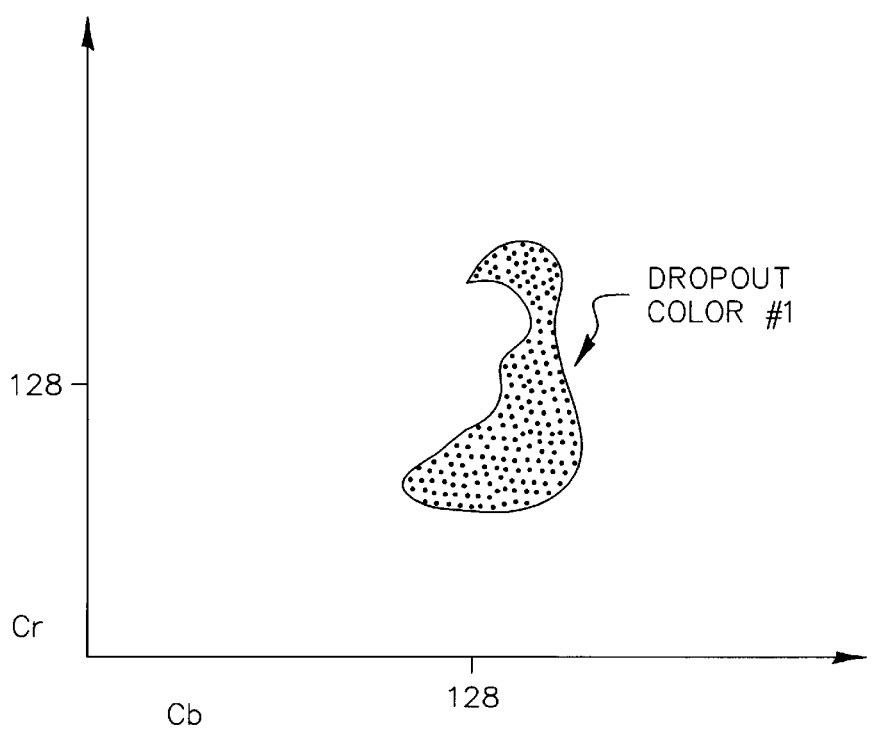
FIG. 5 is a graph of an image processing system according to the present invention, showing a dropout map of detected color #1.
Figure 6:
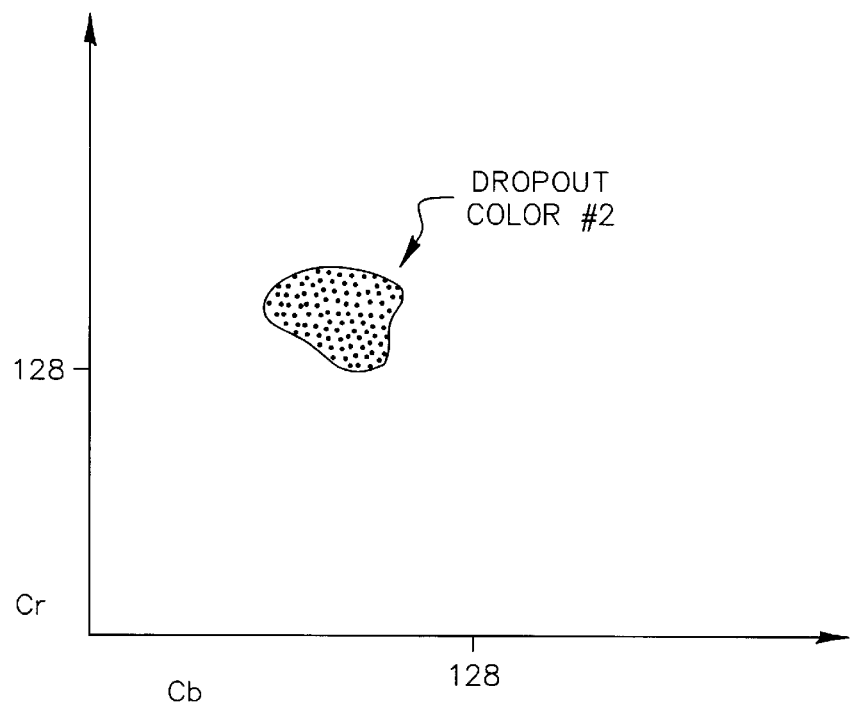
FIG. 6 is a graph of an image processing system according to the present invention, showing a dropout map of detected color #2.
Figure 7:
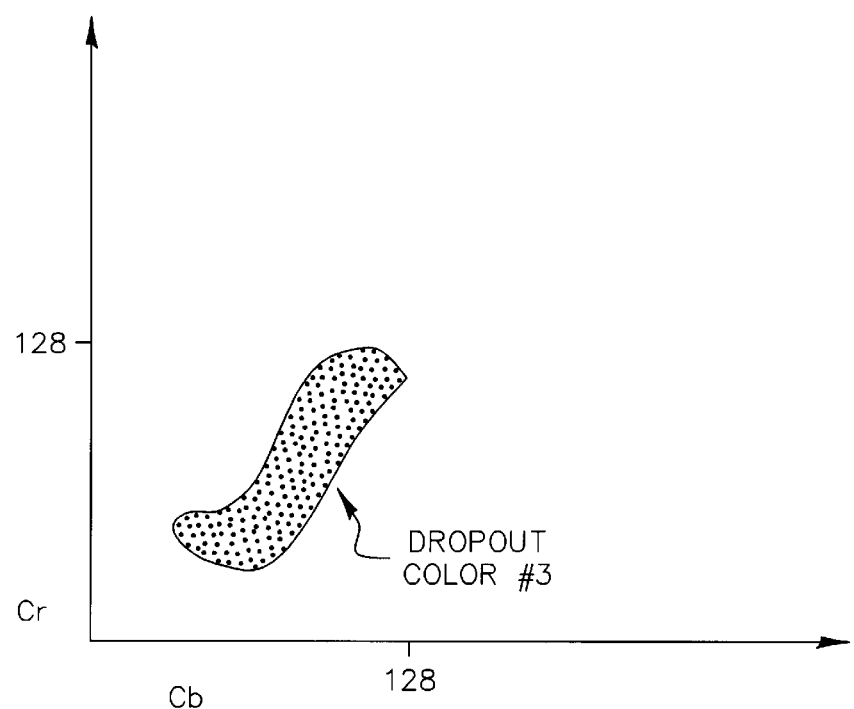
FIG. 7 is a graph of an image processing system according to the present invention, showing a dropout map of detected color #3.
Figure 8:
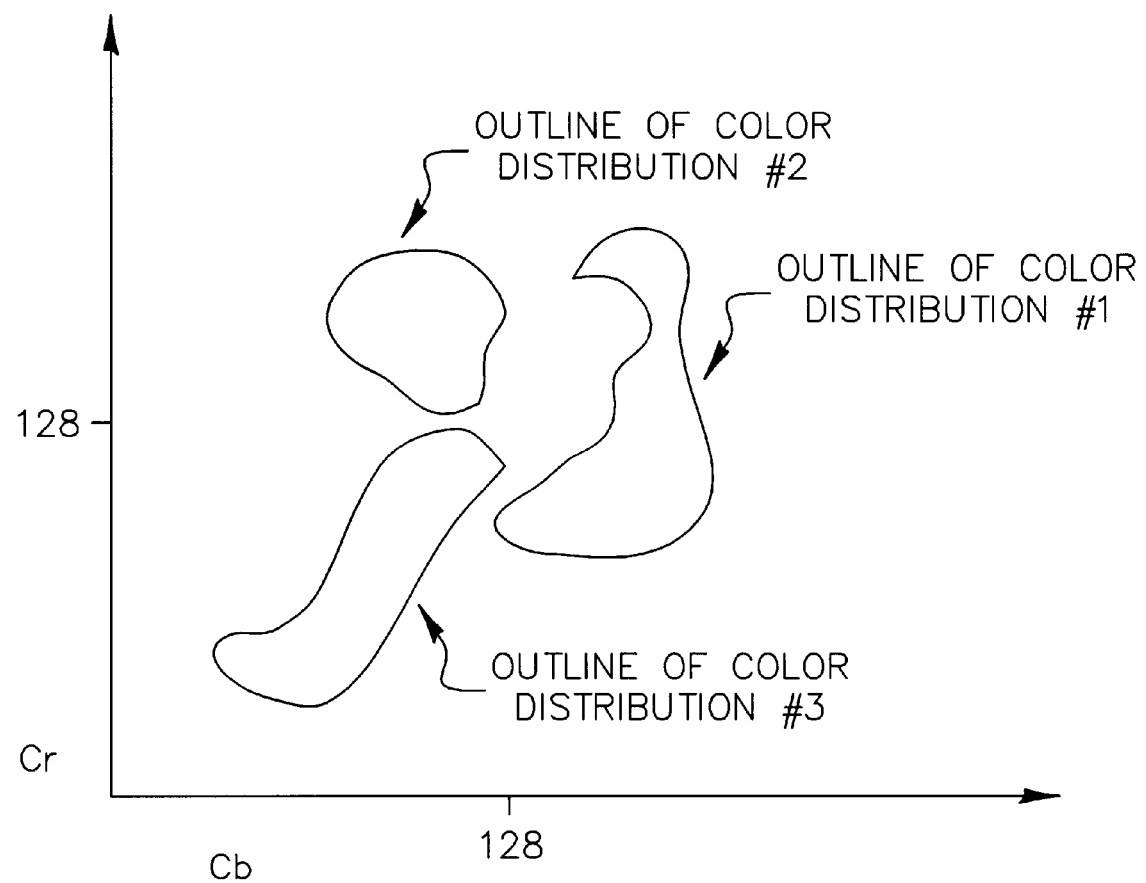
FIG. 8 is a graph of an image processing system according to the present invention, showing a combined color dropout map for detected colors 1–3.

Referring to FIGS. 5–8, a dropout map of the detected color #1 is shown in FIG. 5. In FIG. 6, a dropout map of the detected color #2 is shown. In FIG. 7, a dropout map of the detected color #3 is shown. Thus, distribution maps for extracted dropout colors #1 (FIG. 5), #2 (FIG. 6), and #3 (FIG. 7) are shown. In FIG. 8, a combined color dropout map shows the outlines of color distributions #1, #2, and #3. The color maps shown in FIGS. 5–8 could be generated by a single multi-color form or three different color forms. Once the combined color dropout map is generated, as shown in FIG. 8, a batch of those forms can be processed.

Although the description herein refers to scanning a color form into red, green, and blue (RGB), and performing a color space conversion to YCbCr, the present invention is not limited to these color spaces. Other color spaces can be used herein.

Describing the invention in more detail, the two-dimensional bitmaps are then converted into a collection of look-up tables (see Block 51 in FIG. 1). The inputs into a look-up table (LUT) are Cb and Cr, and the output of the table is either "1" or "0". The "1" indicates that the input color (Cb, Cr) is the color of interest to be eliminated, and the "0" indicates that the input color (Cb, Cr) is the color to be retained. The completion of color detection processing provides a collection of color look-up tables. Each table corresponds to a color of interest to be eliminated. To eliminate multiple colors requires a combination of more than one table.

The color dropout process 16 applies the look-up table, per Block 51, acquired in the color detection process 15 to eliminate or to retain an image pixel in a scanned color form image. The two chrominance (CbCr) data of an image pixel is inputted to the look-up table and outputted as either "1" or "0". If the output of the table is "1", it means that the image pixel is a color pixel to be eliminated by replacing the luminance value of the image pixel with the detected Background Value. The pixel replacement process runs through every image pixel in the digital image and produces a new grayscale image in which the pixels associated with the dropout color are removed and replaced with the Background Value. Finally, an adaptive image thresholding process (ATP) is applied to produce a binary image that is ready for use in optical character recognition (OCR).

In general, the automatic method for processing a color image of the present invention includes: step a) detecting color in a color form by scanning the color form in color space, forming a digital color image, and converting the digital color image to a two-dimensional bitmap image in chrominance space; and step b) conducting a color form dropout process, including dropping the color or colors determined by step a).

The present invention automatically detects colors present on a color form. Each detected color is stored in form of a two, or three, dimensional map. The two or three dimensional map provides a good representation of the detected colors. The complete coverage of colors by the invention translates into more accurate color dropout as compared with available methods.

Other advantages of the present invention include a high degree of flexibility in handling any color or a combination of colors to be dropped out. For example, the look-up table for multiple color dropout can be simply generated by a combination of look-up tables from every single color. Since the color dropout is in grayscale image, residual color pixels, which are missed out in the color dropout processing, are eliminated in the adaptive thresholding process. The color dropout processing of the present invention is therefore a simple point operation suitable for use in high speed production scanning.

As illustrated in FIGS. 2–8, the first step is a), the color detection process 15. Before beginning, a color form sample is/samples are removed from a stack of documents of interest. Step a) most preferably includes the following steps.

(a1) Scanning the color form sample in color by scanning the color form and forming digital image records in RGB space or other color space.

(a2) Converting the digital image records into a luminance (Y) image record and two chrominance (Cb, Cr) image records in the luminance-chrominance (YCbCr) color space. The color conversion from RGB to YCbCr color space involves matrix multiplication as follows:

$Y=0.257R+0.505G+0.098B+16$ $Cb=-0.148R-0.291G+0.439B+128$ $Cr=0.439R-0.368G-0.071B+128$

The RGB values are in the range of (0–255) and the resulting values for YCbCr are (16–235) for Y and (16–240) for CbCr. For a black or neutral color without interference from color noise, both Cb and Cr values are 128 (middle), as shown in the graphs of FIGS. 2–8. However, the real values of Cb and Cr measured in a captured neutral color image are distributed in a wide range, and are adversely affected by color fringes arising from a color image capture and other factors, such as bias in color calibration. FIG. 2 is an example of a color distribution map for a Black & White document when it is scanned in color. The color detection process and the color form process are not limited to the YCbCr color space. Other color spaces, such as LAB, may be used.

(a3) Detecting the background level in the luminance (Y) image record, and assigning it to a Background Value. The background level is detected by histogramming the intensity values of image pixels in the luminance (Y) image record. The intensity value at the maximum accumulated counts is taken as the Background Value.

(a4) Applying the background level to threshold the luminance (Y) image record and producing a binary image, called (B) herein. The background pixels are marked as "Black" and the non-background pixels (objects such as text) are marked as "White" in the binary image (B).

(a5) Measuring color distribution (D) from the calculation for the (Cb, Cr) histogram for the non-background pixels in the binary image (B), most preferably by accumulating the (Cb and Cr) values of the non-background pixels in two chrominance (Cb, Cr) image records.

(a6) Detecting the number of colors and color distributions. This is preferably done by segmenting the (Cb, Cr) color distribution (D) into local regions. The number of local regions represent the number of colors. The distribution of every detected color is represented by a distribution map in which the area belonging to the detected color is marked with "Black"; otherwise, it is marked with "White". The output is a collection of bitmaps (M1, M2, M3, etc.), each representing a dropout color of interest. FIG. 3 provides an example of color distribution of a color form. Such color forms often contain many colors and neutral text. Since the color distribution of neutral objects as shown in FIG. 2 is fixed and inherent in each measured color distribution, the removal of neutral distribution of FIG. 2 from a measured color distribution (D) in FIG. 3 is desirable for improving the precision of color detection. The color distribution resulting from the removal of the neutral distribution as shown in FIG. 4 demonstrates three well-separated local regions. Thus, three colors and distributions can be easily detected and separated by a connected component analysis, as illustrated by the distribution maps of FIGS. 5–7.

(a7) Converting each color distribution map into a color table. A dropout color is represented by a distribution map herein instead of a single (Cb, Cr) value arising from color variation due to color non-uniformity and color fringes from a color scan. To read the dropout color from a color dropout table requires a pair of (Cb, Cr) values as input. If the return of the table is "1", it indicates that the current (Cb, Cr) belongs to the dropout color. Otherwise, it is not a dropout color.

(a8) Selecting the dropout color table of interest for use in the color dropout process. If more than one color is to be eliminated in the dropout process, the color distribution map is generated by merging the maps of the colors of interest. For example, if color #1, color #2, and color #3 are to be eliminated, the combined color maps will be used in the color dropout process. This scenario is shown in FIG. 8.

The second step b), the color dropout process 16, most preferably includes the following steps.

(b1) Scanning a color form of interest to produce a stream of color (preferably RGB) image pixels, or a stream of color pixels and grayscale image pixels;

(b2) Converting the incoming color (preferably RGB) signals of an image pixel into luminance-chrominance (YCbCr) signals;

(b3) Taking the (Cb, Cr) chrominance signals, or the YCbCr signal, of the image pixel as input for the look-up table, and returning with a "0" or "1";

(b4) Replacing the luminance value of the corresponding image pixel by the Background Value (BKV), if the return value of the table is "1"; and (b5) Turning grayscale value (or BKV) of the image pixel into "0" (Black) or "1" (White), preferably by an adaptive thresholding process (ATP). The color dropout process 16 is repeated throughout the entire image to produce a color dropout binary image.

As a final step or steps, a percentage of any remaining noise, such as speckles on the image, can be removed with a noise filter. Also, image processing algorithms may be applied after image dropout to improve the image.

Figure 9:
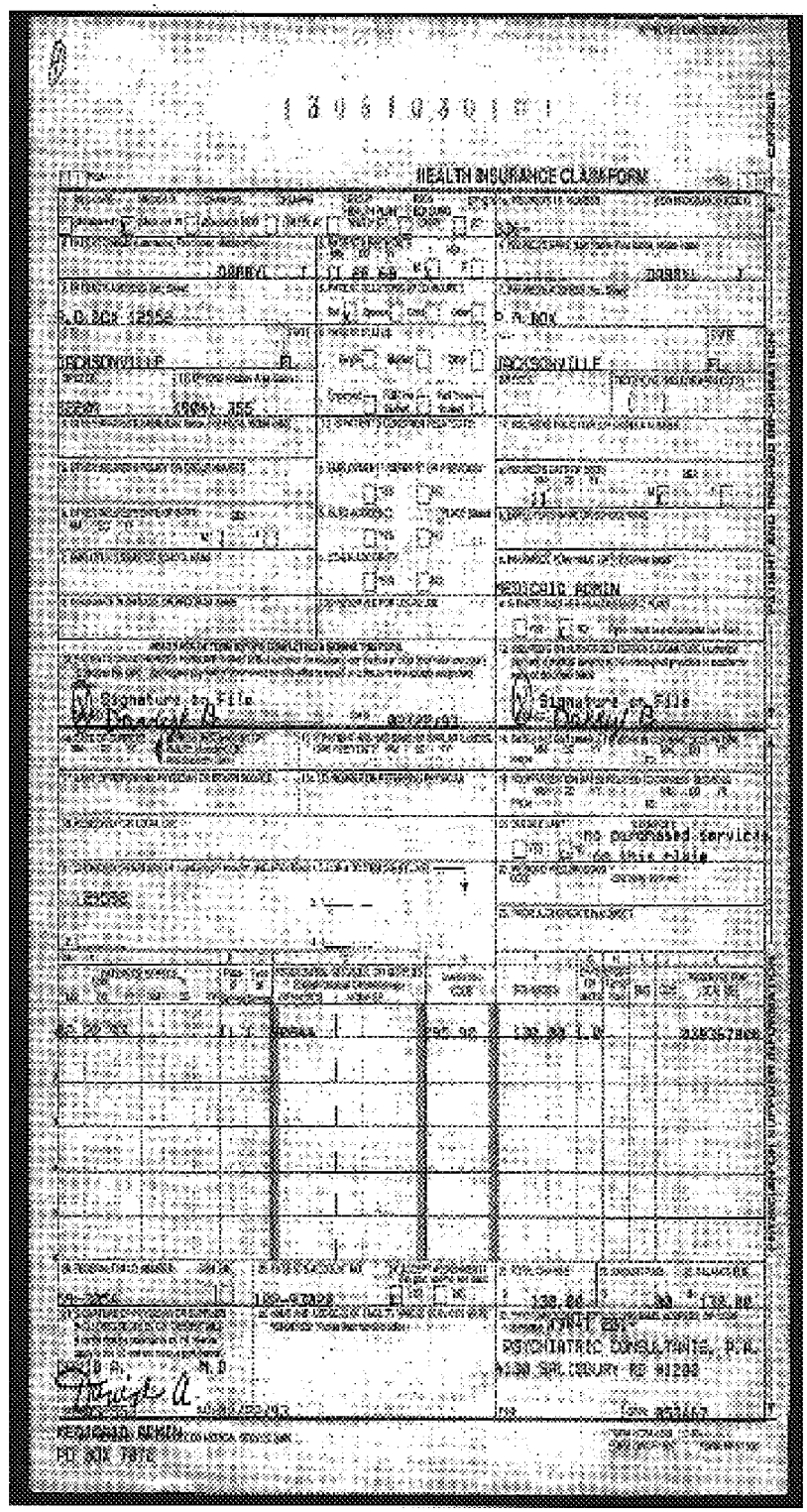
FIG. 9 is a business form with background colors.

Referring to FIG. 9, a business form with background colors is shown. Some of the information about the insured has been deleted to protect his privacy. FIG. 10 shows the business form of FIG. 9 after color dropout according to the present invention.

In addition to the automatic method 14 for processing a color form, the present invention includes the image processing system 10 for automatic color dropout using luminance-chrominance space. Referring to FIG. 1, the system 10 includes:

1) a color detection system, comprising:
   (1a) a color scanner for scanning a color document 11 and providing a digital image, per Block 40;
   (1b) a means for converting the color digital image into luminance-chrominance space, per Block 41;
   (1c) a means for detecting a background gray level, per Block 42, and assigning it to a Background Value;
   (1d) a means for measuring color distribution, per Block 44;
   (1e) a means for detecting the number of colors and their distributions, per Block 45;
   (1f) a means for generating a color drop table for each color present, per Block 46; and
2) a color dropout system, comprising:
   (2a) a color scanner for scanning a color form document 12 and providing a color digital image, per Block 48;
   (2b) a means for converting the color digital image into luminance-chrominance space, per Block 49;
   (2c) a means for storing the color drop table;
   (2d) a means for accessing the color drop table;
   (2e) a means for applying a color dropout map to the digital image; and
   (2f) a means for replacing a pixel value with the Background Value based on the color drop table, per Block 52.

Preferably:
a third dimension is incorporated into the color drop table, which is in luminance-chrominance space;
the digital image comprises grayscale, and color conversion or grayscale;
step (1c) comprises the step of replacing grayscale pixels that contain the color to be dropped by a Background Value. Luminance Y is inputted from Block 49, which describes (2b), above. Here, the Background Value from (1c) (see Block 42 of the color detection process 15) can be used as the replacement grayscale value in (2f), Block 52, which represents the color pixel to be removed. Information from the color dropout table of Block 47, is loaded to the color look-up table, as shown in Block 51. A value of 0 or 1 is inputted from the color look-up table of Block 51 to Block 52.

The system 10 preferably also includes a means for applying an adaptive image thresholding process (ATP), per Block 53, to produce a binary image, preferably a color dropout bitmap image 13.

Figure 11:
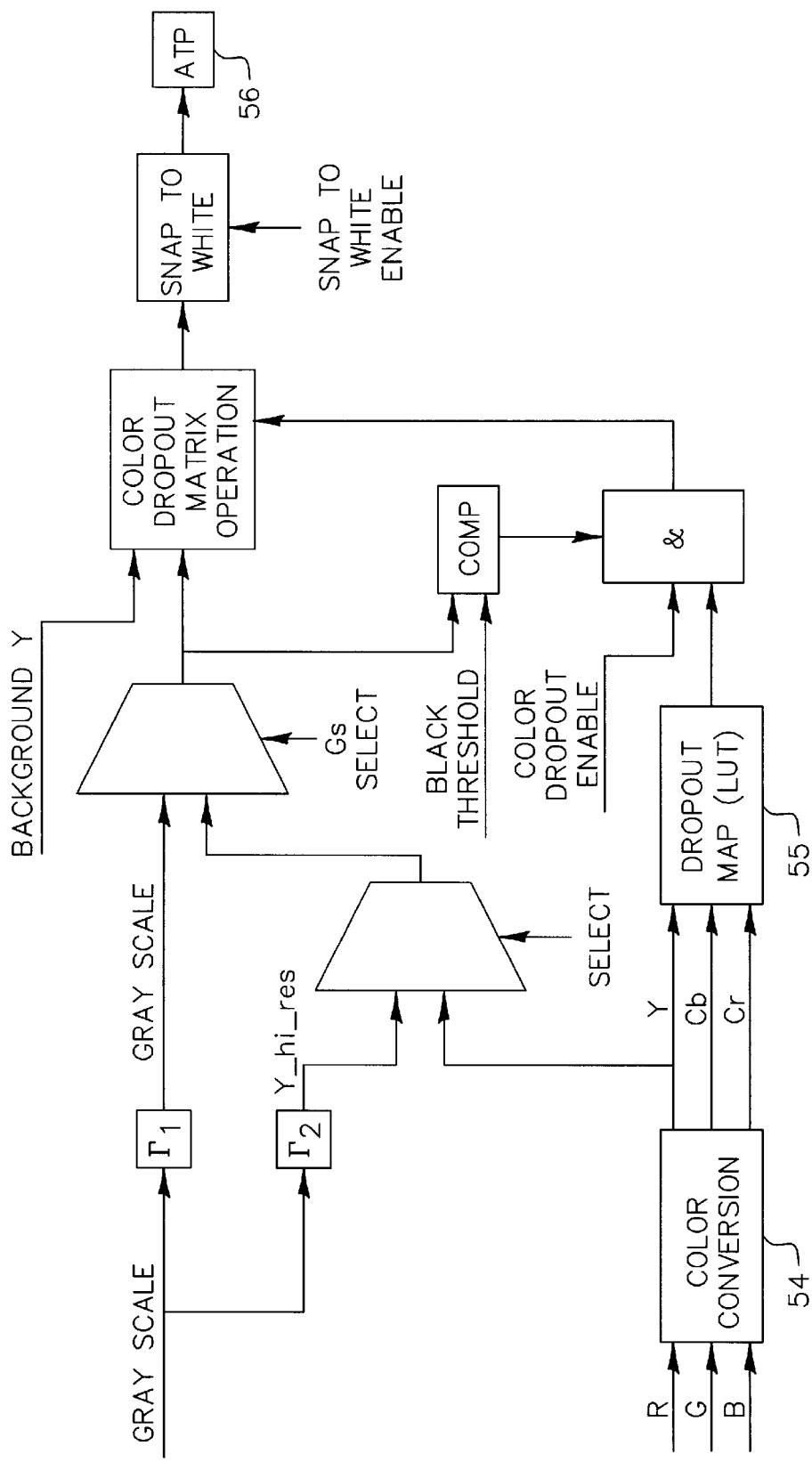
FIG. 11 is a block diagram of a color dropout algorithm according to the present invention.

Referring to FIG. 11, a color dropout method or system according to the present invention is implemented as one of the functions in the image processing chain of production scanners. As seen in FIG. 11, scanned R, G, and B colors are converted to Y, Cb, and Cr channels (Block 54). Cb and Cr channels are then used to access a color dropout map, which resides in a look-up table (Block 55). The look-up table (LUT) is then used in the color dropout matrix operation. This color dropout matrix operation eliminates the form information and retains data entered by users. The retained grayscale data then can be passed through a binarization process, such as adaptive image thresholding process 56 (ATP), to produce binary data for optical character recognition (OCR).

The color dropout ("CDO") algorithm illustrated by FIG. 11 is implemented as follows:
1. For each Cr and Cb pixel location (i,j), Cr(i,j) and Cb(i,j) values are used to calculate an index to the color map.

$$\text{Index}(i,j) = Cr(i,j) + 256 * Cb(i,j)$$

2. If the grayscale channel pixel GS(m,n) has a values less than the threshold TH_BLACK, no color dropout is performed on this pixel. In other words, the pixel retains its original value.
3. If the map at location Index(i,j) is a "0", grayscale pixels GS(m,n) retains its original value, where "m" and "n" are the coordinates of the pixel within the image. If the map indicates a "1", then pixels GS(m,n), GS(m−1,n), GS(m,n−1), GS(m,n+1), and GS(m+1,n) are changed to the Background Value.

In regard to the hardware for the present invention, the color dropout function uses a look-up table (LUT) that contains the colors to be removed. The look-up table will be programmed based on the color detection process 15, which is conducted off-line. By using the color channel's data as the address into the LUT, the function can determine if the grayscale channel's pixel data matches the color that should be removed.

The value read from the LUT is modified based on the result of a black threshold comparison. The black thresholder will compare the grayscale pixel value to a user definable threshold value. If the grayscale pixel value is below the black threshold, then the LUT value is set to 0. Otherwise the LUT value remains the same.

A pixel is only "color-dropped" (i.e. converted to the Background Value) when all of the following three conditions are met:
1. Color dropout function is enabled.
2. The pixel is above the enabled black threshold value.
3. The color map indicates a "1" for the pixel.

In the last step within the color form dropout process, the pixel data can be compared with a "white" level. If the pixel value is above this threshold, then it is changed to the Background Value for background uniformity. This will improve the image when the pixel data is processed by an ATP function.

The invention has been described in detail with particular reference to certain preferred embodiments thereof, but it will be understood that variations and modifications can be effected within the scope of the invention. While preferred embodiments of the invention have been described using specific terms, this description is for illustrative purposes only. It is intended that the doctrine of equivalents be relied upon to determine the fair scope of these claims in connection with any other person's product which fall outside the literal wording of these claims, but which in reality do not materially depart from this invention.

Parts List

10. Present automatic color dropout system
11. Color form sample
12. Color form document
13. Color dropout binary image
14. Present method for color dropout 15. Color detection process
16. Color form dropout process
Block 40. Scanning color form sample and producing digital image
Block 41. Converting scanner output into color
Block 42. Detecting background gray levels
Block 43. Applying a global threshold level
Block 44. Measuring color distribution
Block 45. Detecting colors and distributions in the color form
Block 46. Generating color tables
Block 47. Merging a dropout color table
Block 48. Scanning a color form document and producing digital image
Block 49. Converting output from step (b2) into Cb, Cr, and Y
Block 50. Reading color data
Block 51. Loading to a color look-up table
Block 52. Replacing Y value in the digital image by BKV
Block 53. Applying an adaptive image thresholding process
Block 54. Color conversion
Block 55. Color dropout map
Block 56. Adaptive image thresholding process

What is claimed is:

1. An automatic method for processing a color form, the method comprising the step of:
   a) detecting color in a color form sample, comprising the steps of:
      (a1) scanning the color form sample and producing digital image records;
      (a2) converting the digital image records into a luminance image record and two chrominance image records in a luminance-chrominance color space;
      (a3) detecting background gray levels for the luminance image record from step (a2) and assigning it to a Background Value;
      (a4) applying a global threshold level input to the output of step (a2) to obtain a binary image;
      (a5) measuring color distribution with the output of steps (a4) and (a2);
      (a6) detecting colors and distributions in the color form sample using the output of step (a5);
      (a7) generating color tables with the output of step (a6); and
      (a8) merging a dropout color table with the output of step (a7); and
   b) conducting a color dropout process.

2. A method according to claim 1 wherein step b) conducting the color dropout process, comprises the steps of:
   (b1) scanning a color form document and producing a digital image in the form of a stream of color image pixels;
   (b2) converting the output from the scanner of step (b1) into a luminance channel and two chrominance channels;
   (b3) reading color data from the two chrominance channels;
   (b4) loading to a color look-up table;
   (b5) replacing luminance value in the digital image by a Background Value; and
   wherein information from the color dropout table of step (a8) is loaded to the color look-up table of step (b4).

3. A method according to claim 2 wherein the steps of (b2) through (b5) are repeated for each color pixel within the scanned image.

4. A method according to claim 3 further comprising the step of (b6): applying a threshold function and producing a color dropout bitmap image.

5. A method according to claim 3 wherein the Background Value from step (a3) is used as the replacement grayscale value of step (b5), which represents the color pixel to be removed.

6. A method according to claim 2 wherein a red, green and blue digital image is produced in step (b1), output from the scanner is converted into two chrominance channels, Cb for blue chrominance, and Cr for red chrominance, and one luminance channel, Y in step (b2), and color data is read from the two chrominance channels, Cb and Cr, in step (b3).

7. An automatic method for processing a color image, the method comprising the steps of:
   a) detecting color in a color form by scanning the color form in color space, forming a digital color image, and converting the digital color image to a two-dimensional binary image in chrominance space;
   b) conducting a color form dropout process dropping out the color or colors determined in step a); and
   wherein step b) comprises the step of: replacing grayscale values of color pixels by a Background Value.

8. An automatic method for processing a color image, the method comprising the steps of:
   a) detecting color in a color form by scanning the color form in color space, forming a digital color image, and converting the digital color image to a two-dimensional binary image in chrominance space;
   b) conducting a color form dropout process dropping out the color or colors determined in step a);
   wherein step a) comprises the steps of:
      (a1) Scanning a color form sample in color, and forming digital image records;
      (a2) Converting the digital image records into a luminance image record and two chrominance image records in a luminance-chrominance color space;
      (a3) Detecting the background level in the luminance image record, and assigning to it a Background Value;
      (a4) Applying the Background Value to the luminance image record and producing a binary image;
      (a5) Measuring color distribution for non-background pixels in the binary image;
      (a6) Detecting the number of colors and color distributions;
      (a7) Converting each color distribution map into a color table; and
      (a8) Selecting a dropout color table for use in the color dropout process.

9. A method according to claim 8 wherein step b) comprises the steps of:
   (b 1) Scanning a color form to produce a stream of color image pixels;
   (b2) Converting the incoming color signals of an image pixel into luminance-chrominance signals;
   (b3) Taking the chrominance signals, or luminance-chrominance signals, of each of the image pixels as input for a look-up table, and returning with a "0" or "1"; and
   (b4) Replacing the luminance value of the corresponding image pixel by the Background Value, if the return value of the look-up table is "1".

10. A method according to claim 9 wherein steps (b2) through (b4) are repeated for each color pixel within the digital image to produce a color dropout binary image.

11. A method according to claim 10 wherein scanning is step (b1) is to produce a stream of color pixels and grayscale image pixels.

12. A method according to claim 11 further comprising the step of replacing the grayscale image pixels with the Background Value.

13. A method according to claim 12 further comprising the step of turning grayscale value, or Background Value, of the image pixel into "0" (Black) or "1" (White).

14. An image processing system for automatic color dropout, the system comprising:
1) a color detection system, comprising:
   (1a) a color scanner for scanning a color document and providing a digital image;
   (1b) a means for converting color the digital image into luminance-chrominance space;
   (1c) a means for detecting a background gray level, and assigning to it a Background Value;
   (1d) a means for measuring color distribution;
   (1e) a means for detecting the number of colors and their distributions;
   (1f) a means for generating a color dropout table for each color present; and
2) a color dropout system.

15. An image processing system according to claim 14 wherein the color dropout system comprises:
   (2a) a color scanner for scanning a color form document and providing a digital image;
   (2b) a means for converting the digital image into luminance-chrominance space;
   (2c) a means for storing the color dropout table;
   (2d) a means for accessing the color dropout table;
   (2e) a means for applying a color dropout map to the digital image; and
   (2f) a means for replacing a pixel value with the Background Value based on the color dropout table.

16. An image processing system according to claim 15 wherein a third dimension is incorporated into the color dropout table, which is in luminance-chrominance space.

17. An image processing system according to claim 15 wherein the digital image comprises grayscale, and color conversion or grayscale.

18. An image processing system according to claim 17 wherein step (1c) comprises the step of replacing grayscale pixels that contain the color to be dropped by a Background Value.

19. An image processing system according to claim 18 further comprising a means for applying an adaptive image thresholding process (ATP) to produce a binary image.

20. An image processing system according to claim 19 further comprising a final noise filter.

* * * * *